M. R. Fletcher,
Truss.
Nº 1,501.     Patented Feb. 26, 1840.
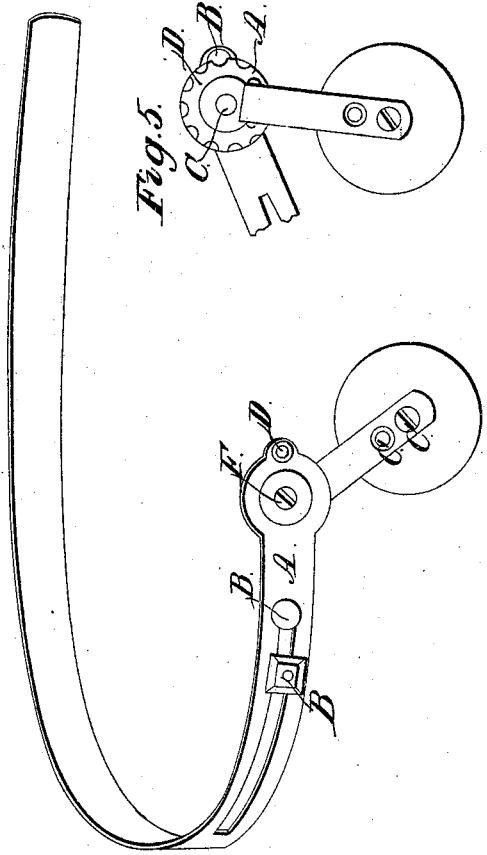

UNITED STATES PATENT OFFICE.

MOORE R. FLETCHER, OF BOSTON, MASSACHUSETTS.

TRUSS FOR THE CURE OF HERNIA.

Specification of Letters Patent No. 1,501, dated February 26, 1840; Antedated August 26, 1839.

*To all whom it may concern:*

Be it known that I, MOORE R. FLETCHER, of Boston, in the county of Suffolk and State of Massachusetts, physician, have invented a new and Improved Method of Adapting Surgeons' Truss-Pads to the Variety of Hernia; and I do hereby declare that the following is a full, clear, and exact description of the construction and operation of the same, reference being had to the annexed drawings, which form a part of this specification, in which—

Figure 1, shows the truss without the covering, Figs. 2, 3, 4, and 5, show the movable parts with their combinations.

The nature of my invention consists in adding to the ordinary truss spring, by means of a pin attached to it which I call the spring-rider, a toothed wheel to which a short spring carrying the pad of the truss is attached and which wheel may be moved around so as to place the pad in any position. A screw passing through the spring rider between the teeth of the wheel to secure it in any position it may be placed in:—a screw also passing through the rivet which confines the toothed wheel to the spring-rider, pressing on the pad spring and thereby increasing or diminishing the pressure of the pad at pleasure.

To enable others skilled in the art to make and use my invention, I will proceed to describe its construction and operation.

I take a piece of sheet steel about four, or four and a half inches in length, and for three or three and a quarter inches of its length, three fourths of an inch wide, and make a slot in it for about two and a half inches of this length, as represented in Fig.
2. A. The remain portion I make wider than the above, and form it into a circular plate about one inch in diameter, with a round hole in the center of it about half an inch in diameter, as represented in Fig. 2, B, and also a semicircular projection on the outer edge opposite to, and in a line with the slot. A round hole is then made, one half of which is in the semicircular projection, and the other in the edge of the plate, as represented in Fig. 2, C, the use of which as well as of that in the center of the plate, I will presently describe. That part of the rider in which the slot is made, is bent to correspond with the spring to which it is to be applied, as shown in Fig. 2. This piece so constructed I call the spring rider, and attach it to the end of the ordinary truss spring in the following manner, viz—I first rivet or otherwise fasten two screws to the truss spring and then place the spring rider upon it and parallel with it, as represented in Fig. 1, A, the screws passing through the slot in the rider, and there secure it by nuts on the screws which pass down upon the rider and keep it in contact with the truss spring—as represented in Fig. 1, B, B. I next make a small toothed wheel of the size of the circular plate already referred to in the rider—in the center of which I make a round hole corresponding with the one in the circular plate in the rider, as represented in Fig. 3, A. I also make two small holes near the edge of this toothed wheel and about half an inch apart—as represented in Fig. 3, B, B, the use of which I will describe hereafter. I next make the pad-spring of sheet steel, about two and a quarter inches long when finished, and half an inch wide— I bend one end of this around a wire, thereby forming the tongue of a hinge, and in the other I make one or more holes—the use of which I will describe. I then attach this spring to the pad, (which may be of any of the usual forms,) by a set screw through one of the holes just referred to, as represented in Fig. 1, C, C. This being complete, I pass a piece of wire through the other end which is like the tongue of a hinge, and bend both ends at a right angle and parallel with the spring, thereby forming a staple, which I put into the two holes referred to in the toothed wheel near the edge, and being riveted on the backside of the wheel, the wheel and the pad-spring form a hinge, as represented in Fig. 5, A. I then countersink the hole in the center of the toothed wheel on the face, or inner side. I then place the toothed wheel on the inner side of the circular plate referred to in the rider, and put a rivet with a very small head—(a section of which is given in Fig. 4, A,) through the hole in the rider and also the toothed wheel: this rivet is then hammered down until the countersink in wheel is filled, which confines the rider and the toothed wheel together—as represented in Fig. 5, D. The wheel will now rotate, and to secure it in any position in which it may be placed, I pass a screw through the hole in the rider one half of which is in the edge of the circular plate, and the other in the semicircular projection attached to it: the head of this screw coming between the teeth of the wheel, prevents it from revolving, as represented in Fig. 5, B. A small nut put on the end of the screw confines it as seen in Fig. 1, D. I then make a hole in the rivet which confines the wheel to the rider, and put a screw through it about three eighths of an inch long, a section of which is given in Fig. 4, B. The outer end is distinctly represented in Fig. 1, E, the other end as it is turned in, presses against the pad-spring and thereby increases the pressure on the pad at pleasure, as represented in Fig. 5, C, the spring being thrown back in order to show the screw.

The parts described and attached to the ordinary truss-spring in the manner herein set forth are covered in the usual manner.

What I claim as my invention and desire to secure by Letters Patent, is—

The attaching of the pad-spring to a wheel as herein described and by this means rendering the pad movable, so that it can be placed in any required position; also the mode of varying the amount of pressure on the pad by means of the screw passing through the rivet and pressing against the pad-spring—also the combination of the spring rider with the wheel and pad-spring and their further combination with the truss spring—the whole being constructed, regulated, and operating substantially in the manner, and for the purpose herein described.

MOORE R. FLETCHER.

Witnesses:
 HY NAYLOR,
 H. H. McPHERSON.